| United States Patent [19] | [11] 4,189,646 |
|---|---|
| Vanderleeden | [45] Feb. 19, 1980 |

[54] PROCESS AND APPARATUS FOR REACTING LASER RADIATION WITH A REACTIVE MEDIUM

[76] Inventor: Johannes C. Vanderleeden, 2626 Woodchester Dr., Mississauga, Ontario, Canada, L5K 3Z7

[21] Appl. No.: 796,328

[22] Filed: May 12, 1977

[51] Int. Cl.² ............................................. H01J 39/34
[52] U.S. Cl. .................................... 250/423 P; 250/373
[58] Field of Search ................... 331/94.5 C; 350/293, 350/294; 250/423 P, 284, 288, 281, 282, 373; 204/DIG. 11; 330/4.3

[56] References Cited

U.S. PATENT DOCUMENTS

| 3,983,020 | 9/1976 | Moore et al. ............... 204/DIG. 11 |
| 4,025,172 | 5/1977 | Freiberg ........................ 331/94.5 C |
| 4,082,633 | 4/1978 | Eerkens ........................ 204/157.1 R |

Primary Examiner—William L. Sikes
Attorney, Agent, or Firm—Ridout & Maybee

[57] ABSTRACT

Reaction of laser radiation and a reactive medium is conducted by reflecting a hollow conical beam of the radiation back and forth between two aspheric mirrors. This gives a long path length for the radiation passing through the medium, although the length of the reaction zone, i.e. the distance between the mirrors, may be comparatively small. By selection of the curvature of the mirrors, the radiation flux density can be controlled so that it is substantially uniform or so that it exhibits a pre-determined cylindrically symmetrical variation across the width of the reaction chamber, and this distribution of the flux density can be matched to the distribution of availability of reactive species within the reaction zone. In many practical applications, such as laser isotope separation, photon-enhanced chemical reaction, laser amplification, or laser resonance, the reactive species will be distributed uniformly within the reaction zone or will be distributed to a varying degree across the width of the reaction zone, this variation being cylindrically symmetrical. By matching the flux density to the availability of the reactive species, the efficiency of the reaction can be increased.

12 Claims, 4 Drawing Figures

PROCESS AND APPARATUS FOR REACTING LASER RADIATION WITH A REACTIVE MEDIUM

BACKGROUND OF THE INVENTION

1. Field of the Invention

This invention relates to processes and apparatus for reacting laser radiation with a reactive medium.

The invention is applicable to reactions where the radiation gains energy from the medium, as well as to reactions where the medium absorbs energy from the radiation. It is thus, for example, applicable to laser amplifiers and laser oscillators wherein an excited medium imparts energy to a laser beam, as well as to processes in which, for example, a chemical reaction is accelerated or initiated by absorption of photons from an incoming laser beam.

One area which is of especial interest is in the laser separation of isotopes, e.g. in the selective laser radiation-induced decomposition of HDCO contained in deuterated formaldehyde, to yield HD and CO.

2. Description of the Prior Art

The inventor is aware of numerous prior proposals of arrangements for reacting laser radiation with a reactive medium, such as are suggested in U.S. Pat. Nos. 3,622,907, Tomlinson; 3,873,942, Reilly; 3,909,744, Wisner et al. and 3,942,127, Fluhr et al. These prior arrangements are not, however, as efficient as might be desired.

SUMMARY OF THE INVENTION

In this invention, the reaction medium is irradiated with laser radiation in a reaction zone bounded by two longitudinally spaced mirrors. The laser radiation passes longitudinally through this reaction zone as a beam which may converge or diverge in cross-section and which is reflected back and forth between the two mirrors. At least one of the mirrors is complexly configured so that on the other mirror each successive interception of the beam by the mirror is immediately adjacent to, but does not overlap, the preceding interception. An advantage of this arrangement is that it enables a multiplicity of passes to be made between the two mirrors, whereby the total path length of travel of the beam through the medium can be increased, while permitting the flux density of the laser radiation at points within the reaction zone to be so selected and so controlled that it can be approximately matched to the availability of reactive species in the medium at various points in the reaction zone.

The term "availability" as used herein means the number of reactive species that present themselves for reaction in a given volume of the reaction zone within a given time. Thus, for example, if a gas of uniform density contains reactive species uniformly distributed through it, then the availability will increase with increasing flow rates through an area of the reaction zone, and if the flow rate is different at different points in the reaction zone then the availability will be different at different points, or if the flow rate through the reaction zone is constant at all points in the reaction zone, then the availability is constant.

In applications of the process of this invention, the availability of reactive species may diminish from one end of the reaction zone to the other and be uniform across substantially all cross-sections of the reaction zone, or may vary continuously across substantially all cross-sections of the reaction zone. For example, a reactive fluid may be supplied longitudinally through the reaction zone under conditions such that the longitudinal velocity of the fluid is the same at all points in the reaction zone, and there is a transversely substantially uniform velocity, and so in any given period of time a given number of reactive species will have been available for reaction at various points in the reaction zone, this number decreasing towards the far end of the reaction zone, because of loss of species through reaction with the radiation.

As examples of instances where a continuous symmetrical transverse variation is encountered, there may be mentioned processes in which a fluid is flowed through the reaction zone in such manner that there is a profile in variation of the velocity of the fluid across the width of the zone. As further examples may be mentioned instances in which a medium is irradiated with energy incident transversely on the reaction zone from some source disposed to one side of the reaction zone. In such case, the outer region of the medium may tend to be excited to a reactive state to a greater degree than regions closer to the middle, so there will be a greater number of reactive species in the outer region.

It can be shown that there is greater efficiency of radiation absorption (or of radiation amplification), and hence an economy of utilisation of energy achieved, when the transverse flux density profile of the laser radiation is so controlled that it matches the transverse distribution profile of the reactive species in the reaction zone. Thus, where the flow velocity of a reactive gas is constant at all points across the width of the zone, then the flux density of the laser radiation should be transversely uniform as far as is possible across all cross-sections of the reaction zone. Where the gas or other reactive fluid exhibits a velocity profile across the width of the reaction zone, or where the number of excited reactive species in the medium exhibits a distribution profile across the width of the reaction zone, then the flux density of the laser radiation should be arranged so that it exhibits a flux density profile as similar as possible to the availability profile.

With the arrangement described above, the efficiency of the process, whether of radiation absorption or of amplification, can be increased, since, considering by way of example a process in which the medium absorbs energy from the beam, as an incoming converging beam travels through the reaction zone its cross-section area of each beam reflected from the complexly configured mirror can be made to converge and decrease at a controlled rate, as determined by the configuration of the mirrors, so as to tend to compensate for the loss of flux density which has arisen as a result of the absorption of energy by the reactive species. In this manner, the flux density profile can be approximated to a desired profile. Correspondingly, with a process where amplification of the radiation is achieved, the flux density of the radiation is controllable through compensation for a gain in flux density by divergence of, and increase in cross-sectional area of, the cross-section of the beam.

A closer approximation to the ideal condition can be achieved when both mirrors are appropriately complexly configured, but in some applications an adequate efficiency may be achievable when one mirror is plane or has a simple geometric curvature.

Through appropriate mathematical calculation, which is with the skill of those skilled in the art, the required configurations of the mirrors can be derived.

At regions of the reaction zone between the mirrors, each beam will overlap an adjacent beam, and in the calculation it is necessary to take into account contributions to the flux density imparted at any given point by not only a given beam but also by its adjacent overlapping beam. Further, depending on the application to which the above arrangement is put, if, as in some advantageous applications, the beam of radiation supplied to the reaction zone is symmetrical about a longitudinal axis of the mirrors, then component rays of the incoming beam will after a number of reflections begin to trace a path which is on the opposite side of the axis from the path on which they entered and is co-incident with a path traced by a component of the incoming beam. Such rays constitute a retracing beam which retraces a beam co-incident with the incoming beam. In such case, allowance has to be made for the contribution to the flux density which is imparted by the retracing beams. By appropriate configuration of one or both mirrors, the flux density contributed by the overlapping incoming beams and the overlapping retracing beams, where present, can be controlled so that at most regions of the reaction zone the flux density is approximately matched to the distribution of availability of the reactive species.

In one preferred form, described hereinafter in more detail, cylindrically symmetrical aspheric mirrors are employed, and the radiation reflects back and forth as a hollow conical beam which is cylindrically symmetrical about a longitudinal axis of the reaction zone.

BRIEF DESCRIPTION OF THE DRAWINGS

The invention can best be described in conjunction with the drawings in which.

DESCRIPTION OF THE PREFERRED EMBODIMENT

Figure 1:
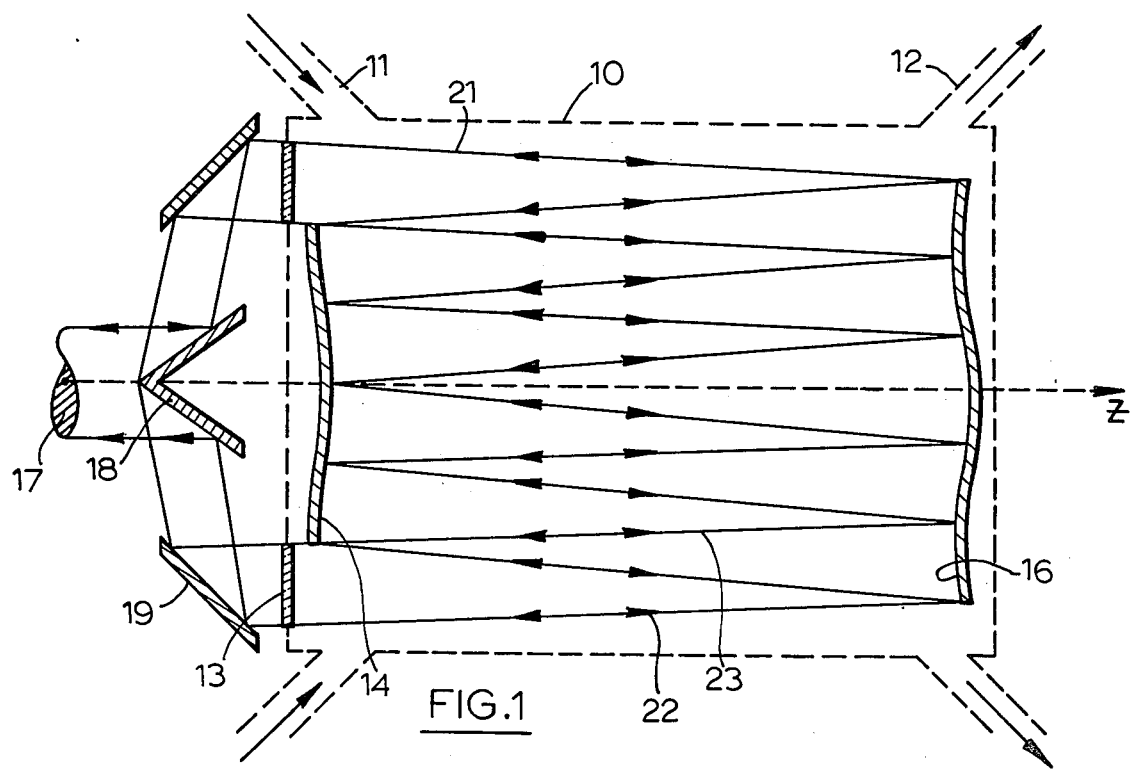
FIG. 1 shows in schematic form a laser reaction chamber for irradiating a fluid with laser radiation.

Referring to the drawings, FIG. 1 illustrates a reactor wherein a beam of laser radiation irradiates a reactive fluid. In the example which will be discussed in more detail below, a reactive fluid absorbs energy from the radiation, but it will be appreciated that the principles discussed hereinafter are also applicable to processes and apparatus in which other reactions and other reactive media are used.

In the example illustrated, the reactor comprises an enclosure 10 which defines a reaction chamber. At one end, there are inlets 11 for introducing a supply of the reactive fluid, and at the opposite end there are outlets 12 through which the reacted fluid can be withdrawn.

At one end, the reactor includes a radiation-transparent annular window 13, through which the laser radiation is introduced into the chamber.

Within the chamber 10, are two longitudinally spaced aspheric mirrors, 14 and 16. These mirrors, along with the annular window 13 and the other elements of the optical system which are described later are co-axial about an optical axis Z, and are cylindrically symmetrical about the axis Z.

In operation, a beam of laser radiation 17 of such wave length as will react with a selected component or components of the reactive fluid, is supplied along the optical axis Z, and is incident on a conical mirror 18, from which the beam is reflected onto a frustro-conical mirror 19, which passes the laser beam as an incoming converging hollow conical beam 21 into the reactor through the window 13. The inner circumference of this beam 21 is contiguous with the periphery of the mirror 14.

This initial beam is incident on mirror 16, and the area of the beam which is intercepted by the mirror 16 is an annular segment. Owing to a selected aspheric configuration of the mirrors 14 and 16, the beam is then reflected back and forth between the mirrors, as indicated in FIG. 2, in a series of converging hollow conical beams, each symmetrical about the Z-axis and each of which is ring-form in cross-section.

Figure 2:
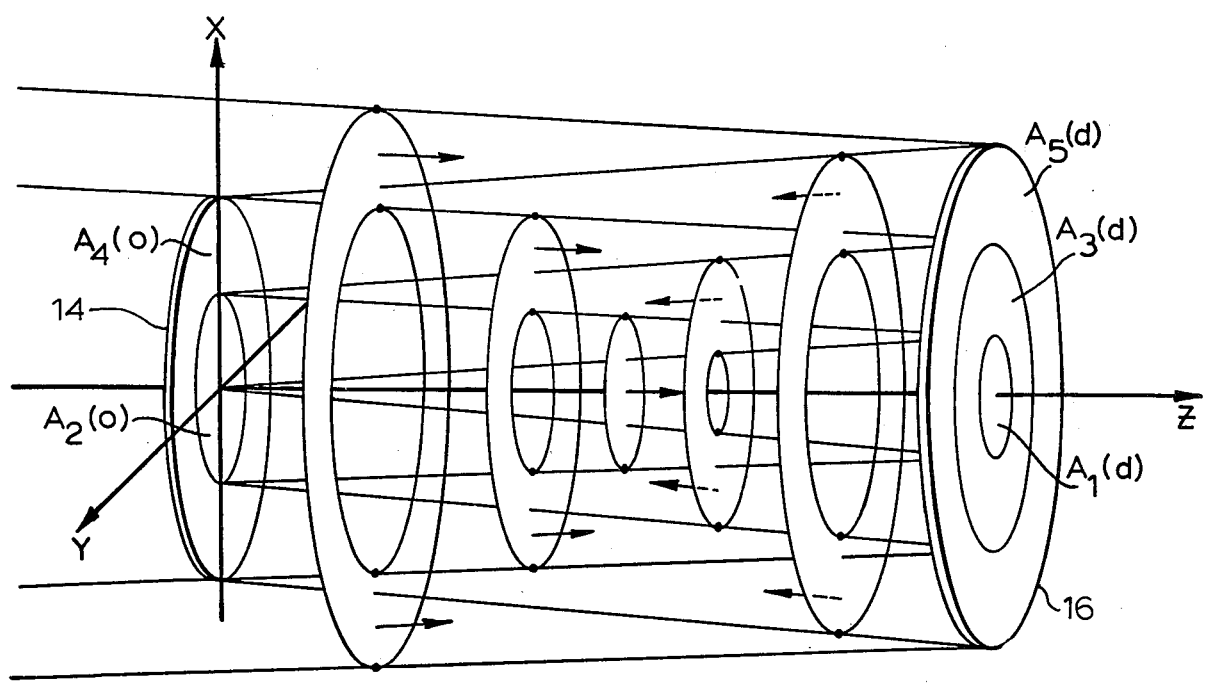
FIG. 2 illustrates schematically cross-sections of radiation beams passing through the reactor.

Cross-sections through successive reflected beams are shown in FIG. 2. The interceptions of these beams by the mirrors 14 and 16 are also ring shaped. It should be noted that the area of the beam intercepted by the mirror at all reflections is an annular segment of outside diameter equal to the inside diameter of the preceding interception of the beam by the same mirror. Thus in FIG. 2, the successive interceptions are denoted by progressively decreasing numerical suffixes in the expressions $A_5$ through $A_1$, while the letters (o) or (d), in parentheses, indicate an interception at the mirror 14 which may be considered to be at the origin, or at the mirror 16, at a distance d from the mirror 14, respectively. These successive interceptions on each mirror, e.g. $A_1(d)$, $A_3(d)$ and $A_5(d)$, completely cover the reflective face of the mirror without overlapping.

It should also be noted that subsequent to the reflection at mirror 14, where the beam has converged to, in effect, a circle and is incident on mirror 14 at the circular area $A_2(o)$, the beam begins to optically reverse, or turn itself "inside out". Thus, in the example illustrated in the drawings, after four reflections on the mirrors 14 and 16, constituent rays of the beam begin to retrace paths originally traversed by rays in the incoming beam. Considering for example a ray in the incoming beam which is close to a ray on the inside diameter of the ring indicated as travelling leftwardly from the annular segment indicated at $A_3(d)$ in FIG. 2, then after reflection at area $A_2(o)$, this ray will, as it passes rightwardly, cross the optical axis Z, and will then be nearer to the Z axis than the adjacent ray which formerly occupied the inner circumference of the beam. In these retracing reversed rings, the former inner circumference thus gradually increases in diameter, while the former outer circumference shrinks in diameter, until a minimum diameter is reached, and thereafter the beam takes the form of a progressively diverging hollow cone, of which the inner boundery is the former outer circumference of the incoming conical beam, while the outer boundary of the retracing conical beam is the former inner boundary of the incoming beam.

In an example of a practical application of this arrangement, the fluid which is passed through the reaction chamber 10 may be, for example, a deuterated formaldehyde vapor, containing a very small concentration of HDCO molecules, and the laser radiation may be of a wave length which is selected in the near UV so as to tend to selectively cause photo predisociation of the HDCO molecules to yield a mixture of deuterated hydrogen and carbon monoxide. While the example illustrated in FIGS. 1 and 2 illustrates schematically only a small number of reflections, in such a practical application it may be desired to have the total path length which is swept by the incoming beam of the order of one km, in order to obtain a significant amount of photo predisociation. In such case, it may be desirable to space the mirrors 14 and 16 axially by a distance of about 50 m so that there are only about 10 reflections of the incoming beam before retracing commences. It may be undesirable to use a large number of reflections, as otherwise there may be an undesirably large power loss through absorption of energy at reflections at the mirrors. In typical examples of applications of the process to photochemical reactions, typically the spacing between the mirrors may be the order of about 1 m to 100 m, and the laser radiation may reflect back and forth for about 10 to 50 times, thus traversing a total path length of about 10 m to 5 km.

It can be shown that in this irradiation process, and in other processes involving interaction of the radiation with a reactive species, there is a greater efficiency of absorption of the radiation where the transverse distribution of flux density in the reactor is matched to the transverse distribution of the availability of reactive species in the fluid or other reactive medium. The arrangement illustrated in the drawings and described in detail above, permits the laser beam to be reflected through a multiplicity of reflections while permitting to a significant degree selection of the transverse distribution of flux density of the radiation at regions within the reactor.

In the arrangement illustrated in FIGS. 1 and 2, this can be achieved by appropriate selection of the configuration of the aspheric mirrors 14 and 16. Considering the conical beam 21 which is originally supplied into the reactor, as the radiation propagates towards the right hand side in FIGS. 1 and 2, it will tend to be attenuated by the fluid, but the degree of convergence of the conical beam, which can be selected by appropriate configuration of the conical mirrors 18 and 19 will result in the annular cross-section area of the beam progressively decreasing, and this decrease in cross-section area can approximately compensate for the decrease in flux density in the radiation beam. Moreover, an exact degree of compensation at the region where the beam strikes the mirror 16 can be provided for by appropriate selection of the convergence of the conical beam taking into account the distance which the beam travels through the absorptive reaction medium from the window 13 to the mirror 16, so that at the point of first reflection on the mirror 16, the average flux density in the annular segment $A_5(d)$ can be made the same as at the point of entry into the reactor through the window 13.

The curvature of the mirror 16 in the segment $A_5(d)$ can then be selected to be such that the reflected cone satisfies two conditions when it is intercepted by the mirror 14. Firstly, the outside diameter of the hollow cone at this point can be made equal the inside diameter of the hollow cone which entered the reaction chamber, so that there is no area of the reactor left unswept by the radiation. Secondly, the area of the annular segment $A_4(o)$ intercepted by the beam on the mirror 14 can be made such that the averge flux density in this annular segment is the same as the flux density in the segment $A_5(d)$, the convergence of the beam travelling from the mirror 16 to the mirror 14 having compensated, to a required degree, for the attenuation of the beam which results from its reaction with the reactive fluid.

The curvature of the mirror 14 in the segment $A_4(o)$ can then be selected according to a similar set of considerations, and thence at the segment $A_3(d)$, and so on, so that the succeeding reflections of the conical beam are so arranged, by selection of the curvature of the mirror at the various zones of reflection, that the average flux density at each intercept with each mirror 14 and 16 remains substantially constant.

It should be noted that the successive annular segments of each of the incoming beam and the retracing beam completely cover the mirrors 14 and 16 without overlapping on the mirrors, but within the interior of the reactor, in regions spaced between the mirrors, the adjacent cones intercept, and the rings overlap partially. Thus, at substantially all points in the interior of the reactor, the total flux density is the sum of the contribution from a cone and an adjacent overlapping cone. These, however, are nearly equal, and the total flux density at any point is therefore twice the contribution from these two cones, except, it will be noted, at a radially outer region of the reactor, which is either unswept by radiation or is swept only by the first incident beam at 21, which is supplied direct through the window 13, but not by the beam subsequently reflected from segment $A_5(d)$. In most practical applications, where the number of reflective passes is high, and thus the angle of the incoming cone is selected to be small, this radially outer region is a small proportion of the total volume of the reactor.

Considering in more detail the calculations which are required to arrive at the optimum configuration of the mirrors, there may be considered by way of example a process in which a reactive fluid is supplied through the reactor 10, wherein the fluid has a transverse velocity profile, that is to say, its velocity has a dependence on the radial distance from the Z axis. It can be shown that the condition for optimum radiation absorption is $$\int_{z=0}^{d} F(r, z)dz \propto V(r) \tag{1}$$

where $F(r,z)$ is the radiation flux density in a single cone as a function of radial distance from the Z-axis, z is distance along the Z-axis measured from mirror 14, $V(r)$ is the fluid velocity as a function of r, and d is the spacing of the mirrors 14 and 16.

Considering, as one case of special interest, where $V(r)$ is a constant, from Eq. (1) the flux density must satisfy the condition $$\int_0^d F(r, z)dz = \text{Constant} \tag{2}$$

At points within the reactor the flux density in a single cone $F(r,z)$, is the sum of the contribution from the incoming cone, $F^i(r,z)$, and from the retracing cone, $F^r(r,z)$. As discussed earlier, there also has to be considered the contribution from a given cone and from an adjacent overlapping cone, and these are nearly equal, so that the total flux density $F^t(r,z)$ is therefore approximately twice the sum mentioned.

$$F^t(r, z) \cong 2 F(r, z) = 2 \{F^i(r, z) + F^r(r, z)\} \tag{3}$$

In the more general situation where $V(r) \neq$ Constant it can be shown that the efficiency of the reaction can be optimized by adjusting the mirror curvatures so that the average flux density $\bar{F}(r,z')$ over any ring on the mirrors (at $z'=0$ or d) is given by $$\bar{F}(r, z') = \frac{\int_{R_a}^{R_b} F(r, z')rdr}{\int_{R_a}^{R_b} rdr} \propto \frac{\int_{R_a}^{R_b} V(r)rdr}{\int_{R_a}^{R_b} rdr} \quad (4)$$

where $R_a$ and $R_b$ are the inside and outside diameters of the ring.

In addition to approximately satisfying Eq. (1), the above arrangement also allows the photon losses to be reduced, subject to economic considerations. Considering a ray in the incoming cone which enters the reactor and exits in the retracing cone, the proportion of photons that are lost without making a useful contribution to the reaction depends on the ratio $\xi = $ (Mirror and other losses per pass)/(Absorption in the reactive fluid per pass), as well as on the laser power that is lost in the retracing cone as it exits from the reactor. The latter decreases exponentially with increasing path length travelled by the ray in the reactor.

This proportion can be made arbitrarily small by increasing the length of the reactor or the number of reflections. The latter may necessitate increasing the diameter of the mirrors. It may be noted that in some cases the radii of the mirrors may be as great as or greater than the separation of the mirrors, as long as $\xi$ remains small enough.

Let $N(r,z)$ be the number density of the reactive species in the reactive fluid, and it is assumed that $N(r,o)=N_o$, a constant, where the fluid enters the reactor ($Z=0$), i.e. the density is assumed to be constant and r-independent at the point of entry to the reactor.

The depletion, D, of reactive species owing to reaction can best be expressed in terms of $N(r,d)$ and $V(r)$ as follows, $$D = 1 - \int_0^{R_{rc}} N(r, d)V(r)rdr/N_o \int_0^{R_{rc}} V(r)rdr. \quad (5)$$

where $R_{rc}$ is the radius of the reactor. The ratio of integrals is the throughput of reactive species N at the outlet of the reactor, divided by that at the entrance. To determine what factors maximize D, an analytical expression is required for $N(r,d)$, and this can be obtained from a solution of the coupled rate equations for $N(r,z)$ and $F(r,z)$. For any given total number of photons in the reactor, further calculation within the skill of those skilled in the art shows that for an optimum value of D, the condition of Eq. (1) has to be satisfied, and that in the general case, for an optimum depletion of reactive species, both mirrors should be configured so that the following relationship is satisfied.

$$\int_{R_{n-1}}^{R_{n+1}} V(r)rdr = \int_{R_{n-2}}^{R_n} V(r)rdr \left( \frac{\cosh[n\lambda(d)]}{\cosh[(n-1)\lambda(d)]} \right) \text{(on mirrors)}. \quad (6a)$$

where $R_n$ and $R_{n-2}$ are the outer and inner radii of the nth annular segment of the beam intercepted by a mirror, $R_{n+1}$ and $R_{n-1}$ are the outer and inner radii of the (n+1)th annular segment, on the opposite mirror, and $$\lambda(d) = \sigma \int_0^d N(z)dz.$$

where $\sigma$ is the molecular absorption cross-section of the reactive species.

In the simple case that $V(r)=$Constant this becomes $$A_{n+1} = A_n \frac{\cosh[n\lambda(d)]}{\cosh[(n-1)\lambda(d)]} \text{ (on mirrors)}. \quad (6b)$$

where $A_n$ and $A_{n+1}$ are the areas of the nth and (n+1)th annular segment. From Eq. (6a) or (6b) can be derived an iterative expression for $R_{n+1}$ in terms of $R_1, R_2 \ldots R_n$, the known velocity profile $V(r)$ and $\lambda(d)$. If the mirror curvature is adjusted so as to yield the above set $R_1, R_2 \ldots R_n$ then the efficiency of the reaction can be enhanced.

By way of example, the mirror curvature parameters will be determined such that Eq. (6b) is satisfied, whereby the average flux density distribution in the reactor will satisfy (1) and (2).

Figure 3:
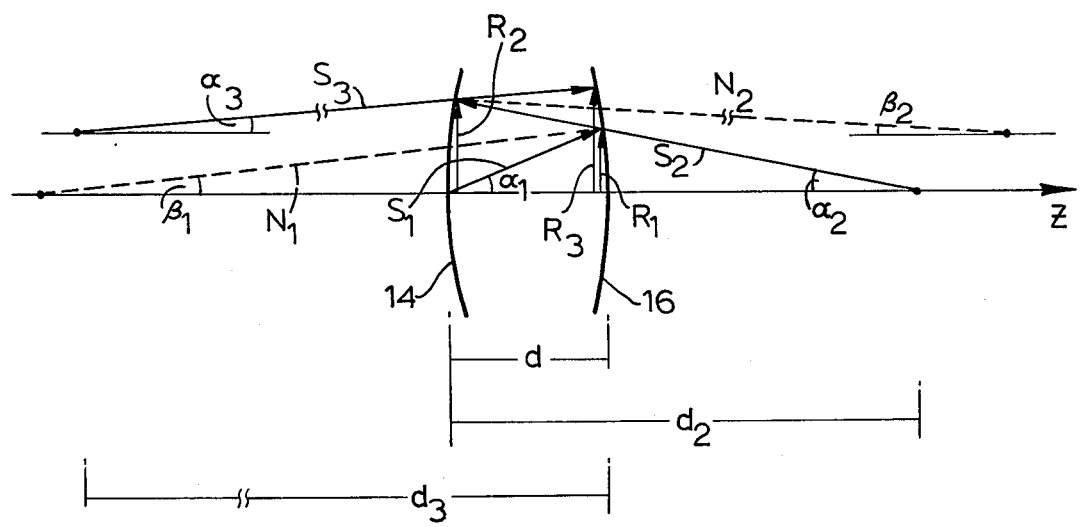
FIG. 3 is an optical diagram employed in determining the curvatures of the mirrors in the reactor.

The calculation can be simplified by considering FIG. 3 where there is traced the path of a ray, $S_1$, starting at the center of mirror 14. This ray, which represents a typical ray lying on the inner or on the outer surface of the conical beam, is specified by its direction vector $S_1$ which makes a small and arbitrary angle $\alpha_1$ (the apex angle) with the optical axis Z and intersects the mirror 16 at a radius $R_1$. At this point of intersection, the curvature of mirror 16 is specified by the vector $N_1$ which is normal to the mirror surface and intersects the optical axis at the angle $\beta_1$. $N_1$ (and $\beta_1$) are to be chosen such that the reflected ray $S_2$ intercepts mirror 14 at a radius $R_2$ such that Eq. (6b) is satisfied. This procedure is then repeated for all subsequent reflections, wherein the corresponding angles can be denoted as $\alpha_2, \alpha_3$, etc. and $\beta_2, \beta_3$, etc. The sign convention used in FIG. 3 is that mirrors 14 and 16 are both considered to be concave so that the normal vectors $N_1$, $N_2$ and intercept angles $\beta_1, \beta_2$ are positive as drawn, as are $S_1$, $S_2$ and $\alpha_1, \alpha_2$.

As the angles $\alpha_1, \alpha_2 \ldots \alpha_n$ and $\beta_1, \beta_2 \ldots \beta_n$ are small, the approximations of Gaussian optics can be employed, so that $$R_n = N_n \beta_n, \quad (7)$$

or in terms of $\alpha_1, \alpha_2 \ldots \alpha_n$ $$R_n = R_{n-1} + d\alpha_n = d(\alpha_1 + \alpha_2 + \ldots \alpha_n). \quad (8)$$

In Eqs. (7) and (8) and in the following, n assumes the values $n=1, 2 \ldots k$ where k is the number of reflections above the z-axis, i.e. $k=5$ in FIGS. 1 and 2. The convention is adopted that any subscripted variable $X_m = 0$ if $m \leq 0$, e.g. $R_{n-2} = 0$ if $=1$. As seen from FIG. 3, the angles $\alpha_n$ and $\beta_n$ are related by $$\alpha_{n+1} = \alpha_n - 2\beta_n, \quad (9)$$

and using Eqs. (7) and (8) this gives $$\alpha_{n+1} = \alpha_n - 2d(\alpha_1 + \alpha_2 + \ldots \alpha_n)/N_n \quad (10)$$

or $$N_n = -2d(\alpha_1 + \alpha_2 + \ldots \alpha_n)/(\alpha_{n+1} - \alpha_n). \quad (11)$$

Eqs. (6a) or (6b) together with (8) to (11) can be solved to give the mirror parameters $R_n$, $N_n$ and $\beta_n$ in terms of $\alpha_1$, d, $\lambda(d)$ and V(r). In the case that V(r)=Constant the following iterative expression for $\alpha_{n+1}$ can be derived.

$$\alpha_{n+1} = \pm \left[ \frac{\cosh n\lambda(d)}{\cosh(n-1)\lambda(d)} \{(\alpha_1 + \alpha_2 + ...\alpha_n)^2 - (\alpha_1 + \alpha_2 + ...\alpha_{n-2})^2\} + (\alpha_1 + \alpha_2 + ...\alpha_{n-1})^2 \right]^{\frac{1}{2}} - (\alpha_1 + \alpha_2 + ...\alpha_n). \quad (12)$$

The + sign is the one of interest in this example as it describes the case where the ray continues to travel away from the Z-axis rather than being reflected back toward the Z-axis.

Referring to FIG. 3, it will be noted that in designing the reactor and the mirror configuration, the angle $\alpha_1$ can be selected so as to give an appropriate number of reflections giving a total path length of the beam of approximately the desired magnitude, taking into account the length of the reactor and the diameter of the mirrors that are proposed to be used. For a given separation of the mirrors 14 and 16, the angle $\alpha_1$ may be selected to be small where the diameter of the reactor and of the mirrors is to be small, or $\alpha_1$ may be selected as a larger angle where the reactor diameter is to be larger.

An example of employing Eq. (12) to calculated mirror parameters can be given. From Eq. (12)

$$\alpha_2 = \left[ \frac{\cosh\lambda(d)}{1} \{\alpha_1^2\} \right]^{\frac{1}{2}} - \alpha_1 \quad (13)$$

A typical value for $\lambda(d)$ would be about 0.15. Eq. (13) then reduces to $$\alpha_2 = 0.00562\alpha_1 \quad (14)$$

From Eq. (9)

$$2\beta_1 = \alpha_1 - \alpha_2 \quad (15)$$

Thus from the selected value of $\alpha_1$, it is possible to calculate $\alpha_2$ and the value $\beta_1$. This procedure is reiterated to calculate successive values of $\alpha_1$, $\alpha_2$, $\alpha_3$, etc. and the corresponding values of $\beta_1$, $\beta_2$, $\beta_3$, etc., which are indicative of the mirror curvatures which are required at the corresponding radii $R_1$, $R_2$, $R_3$, etc. as shown in FIG. 3, on the mirrors. As these radii progressively increase, at a rate which depends on the spacing d between the mirrors, eventually the desired maximum radius of the mirrors will be exceeded. It will be noted the angles of the final and of the penultimate rays, as indicated by reference numerals 22 and 23 in FIG. 1, indicate the required form of entry cone which is to be supplied by the conical mirror system 18 and 19.

It will be noted that the manner in which $\beta$ (the general term for $\beta_1$, $\beta_2$, $\beta_3$ etc.) changes with respect to R (the mirror radius) is dependent on the value of $\lambda(d)$, on the value initially selected for $\alpha_1$, and on the spacing d between the mirrors, as may be seen from Eqs. (7) and (11).

Figure 4:
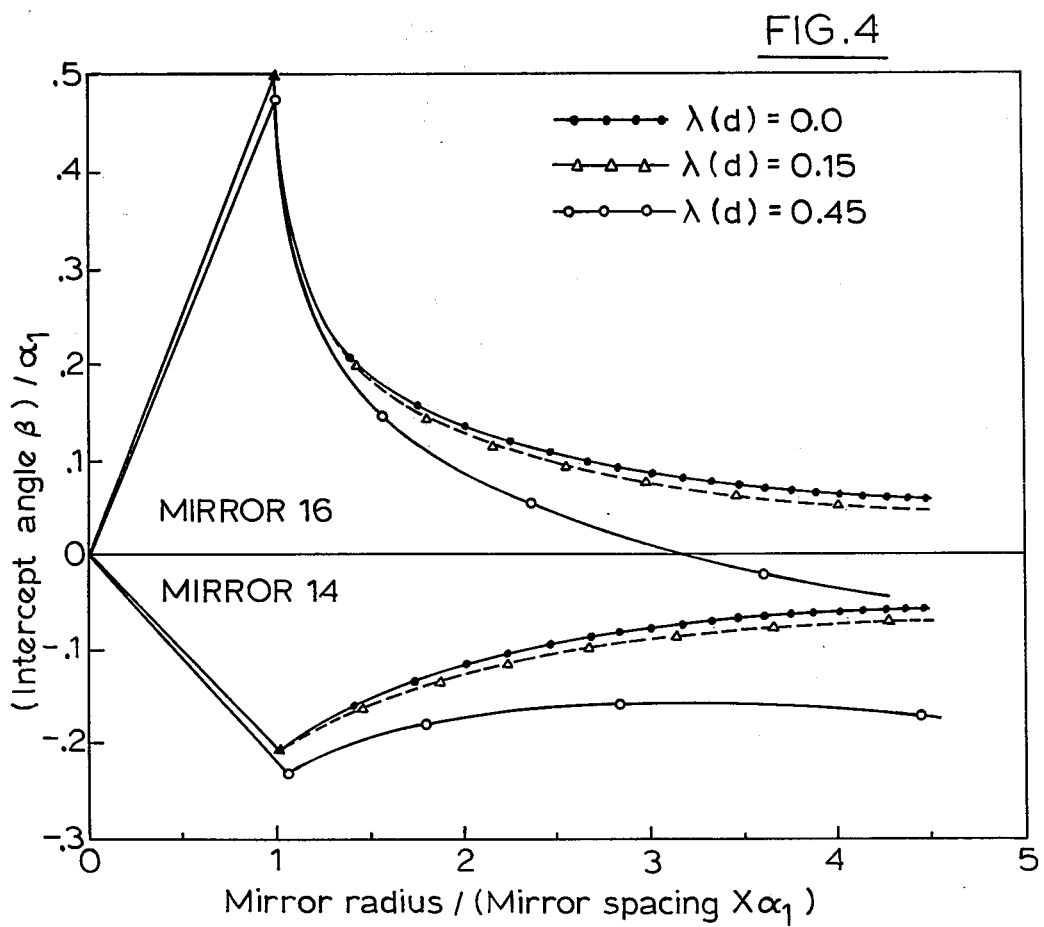
FIG. 4 is a graph illustrating parameters of the mirrors employed in the reactor.

In FIG. 4 there are shown, for various values of $\lambda(d)$, some graphs of $\beta$ (in terms of $\beta/\alpha_1$) against the mirror radius (in terms of $R/(d\alpha_1)$, calculated for the case that V(r)=Constant, for the two mirrors 14 and 16. The curves for mirror 14 have negative values of $\beta/\alpha_1$ and almost all those for mirror 16 are positive, so that mirror 14 is convex and most of mirror 16 is concave. Successive reflections at $R_1/d\alpha_1$, $R_2/d\alpha_1$ ... $R_n/d\alpha_1$ are indicated by points on the curves. It can be shown by those skilled in the art that, as indicated in FIG. 4, all curves are straight lines from the origin up to the first reflection points $R_1/d\alpha_1$ (mirror 16) and $R_2/d\alpha_1$ (mirror 14) which implies that $N_1$ and $N_2$ are constant and the central mirror segments spherical. Beyond these points $|\beta/\alpha_1|$ decreases smoothly, indicating that both mirrors are "flattening out", and in the case $\lambda(d)=0$, where there is no change in the number of reactive species along the reactor because there is no reaction with the radiation, $\beta/\alpha_1 \to 0$ as $R/d\alpha_1 \to \infty$.

The curves with $\lambda(d)\neq 0$ are qualitatively different, as is best seen by considering the case $\lambda(d)=0.45$. Here $\beta/\alpha_1$ for mirror 16 not only reaches $\beta/\alpha_1=0$ (a flat mirror surface) at a value $R/d\alpha_1=3.12$ but it continues to go negative (i.e. the mirror surface changes from concave to convex). However, for mirror 14 $|\beta/\alpha_1|$ merely reaches a minimum (i.e. the mirror never becomes flat outwardly from its centre and is always convex). A similar behaviour occurs for $\lambda(d)=0.15$ at $R/d\alpha_1=9.5$.

It may be noted that in some cases precaution may need to be taken against the possibility of unabsorbed power being transmitted by the retracting beam back to the laser amplifier or other source of the incoming laser beam and thereby damaging the optics. With the design shown in the drawings this problem can be reduced by dividing the laser beam with a polarized beam splitter so that the incident beams above and below the optical axis have orthogonal polarizations. This may serve to isolate from the amplifier may unabsorbed power in the retracing beam.

In some arrangements, multiple laser beams of the same or different wavelengths may be launched into the reactor. This may be done, for example, by removing the coaxial conical mirrors 18 and 19 and coupling the beams into the reactor through the annular entrance window 13. The beam convergence necessary to satisfy Eqs. (6a) and (6b) over the outermost annular segments $A_n$ and $A_{n+1}$ can be provided with a lens. Where coincident beams of different wavelengths are supplied, $\lambda(d)$ may not be the same for both beams, but Eq.(1) can still be approximately satisfied using mirror configurations which are a compromise between the conditions called for by each beam.

While the above has referred in detail to laser isotope separation, it should be noted that the principles are applicable to other forms of reaction, e.g. to photon-enhanced chemical reactions, where the same consideration of photon efficiency applies, with the concept of optimum chemical product formation taking the place of optimum depletion of a molecule containing a particular isotope. The kind of reactor which has been described in detail above can therefore be adapted without significant modifications to such processes.

Further, the above described mirror configuration may be employed in a laser amplifier or in a resonator when the space between the mirrors is filled with a medium having optical gain.

When used as a multiple pass amplifier, the input signal can be injected through the central area of mirror 16 ($A_1(d)$ in FIG. 2), this central area then being made non-reflecting, and the output of the amplifier being extracted around the periphery of mirror 14. The advantage of such an amplifier configuration is that it permits an increased amount of energy to be extracted from the medium. Employing the considerations discussed in the calculations above, the configuration of the mirrors can be designed so as to produce a flux distribution that reduces the total population inversion in the amplifer, for a given pumping rate. This increases the efficiency of energy extraction and the power gain. For example, if the population inversion density $N_o$ is uniform throughout the medium then $F(r,z)$ should be uniform also, and Eq. (6b) becomes $$A_{n+1} = A_n \exp[\lambda^*(d)] = A_n \times \text{(Single pass gain)}. \quad (16)$$

The quantity $\lambda^*(d)$ is given by $\lambda^*(d) = \sigma N_o d$, where $\sigma$ in this case is the stimulated emission cross-section. In deriving Eq. (16) the cosh terms in Eq. (6b) are replaced by exponentials because this arrangement does not involve the addition of flux densities due to the incoming beams and retracing beams. In this instance, the only beam to be considered is a beam which corresponds to the retracing beam in the laser isotope separation process described in detail above with reference to the drawings.

The mirror configuration described in detail above with reference to the drawings may also be useful in an unstable laser resonator with the energy leaving the cavity around the periphery of mirror 14 in the form of diffraction losses. As before, the advantage lies in the possibility of achieving the maximum energy extraction from the laser medium. Further, the arrangement described above in detail can be adapted, with the same energy extraction advantages as before, to lasers or amplifiers having an annular gain region with the axial region obscured. In an amplifier application the radiation is then injected through area $A_3(d)$ indicated in FIG. 2, with the obscured volume bordered by $A_1(d)$ and $A_2(O)$. When used as a laser, the mirror curvature of $A_3(d)$ must be modified so as to reflect the radiation coming from $A_4(O)$ back to $A_4(O)$, rather than direct it onto $A_2(O)$.

The embodiments of the invention in which an exclusive property or privilege is claimed are defined as follows:

1. A process for reacting laser radiation with a reactive medium, which comprises:
providing a reaction zone having opposed first and second ends defining a flow path through said zone,
providing at said ends a pair of opposed reflecting surfaces,
flowing the reactive medium through the reaction zone in a direction from said first end to said second end, the medium containing a reactive species having a predetermined distribution profile transverse to the direction of flow,
directing a beam of laser radiation having a predetermined cross-sectional configuration into the reaction zone along a path intersected by one of said reflecting surfaces, and
successively reflecting the beam between said surfaces along successive paths of progressively changing cross-sectional area intersected by respective, contiguous, non-overlapping areas of said surfaces, thereby generating at substantially all transverse cross-sections of the reaction zone a radiation flux density profile which is related in a predetermined manner to the transverse distribution profile of the reactive species.

2. A process for reacting laser radiation with a reactive medium, which comprises:
providing a reaction zone having an axis of symmetry and bounded by opposed first and second ends defining an axially symmetrical flow path through said zone extending therebetween,
providing at said ends a pair of opposed, coaxial reflecting surfaces,
flowing the reactive medium through the reaction zone in a direction from said first to said second end, the medium containing a reactive species having a predetermined distribution profile transverse to the direction of flow,
directing a beam of laser radiation having a predetermined cross-sectional configuration into the reaction zone along an axially symmetrical path intersected by one of said reflecting surfaces, and successively reflecting the beam between said surfaces along successive paths of progressively changing cross-sectional area intersected by respective, contiguous, non-overlapping areas of said surfaces, thereby generating at substantially all transverse cross-sections of the reaction zone a radiation flux density profile which is related in a predetermined manner to the transverse distribution profile of the reactive species.

3. A process according to claim 2, wherein said beam of laser radiation is directed into the reaction zone as a hollow conical beam.

4. A process according to claim 3, in which the beam is directed into the reaction zone along a path which is contiguous with an edge of one of said reflecting surfaces.

5. A process for reacting laser radiation with a reactive medium, which comprises:
providing a reaction zone having an axis of symmetry and bounded by opposed first and second ends defining an axially symmetrical flow path through said zone extending therebetween,
providing at said ends a pair of opposed, coaxial reflecting surfaces,
flowing the reactive medium through the reaction zone in a direction from said first to said second end, the medium containing a reactive species having at all cross-sections of the reaction zone a uniform distribution profile transverse to the direction of flow,
directing laser radiation as a hollow conical beam of predetermined cross-sectional configuration into the reaction zone along an axially symmetrical path intersected by one of said reflecting surfaces, said axially symmetrical path being contiguous with an edge of the other reflecting surface, and
successively reflecting the beam between said surfaces along successive paths of progressively changing cross-sectional area intersected by respective, contiguous, concentric, non-overlapping area of said surfaces, thereby generating at substantially all transverse cross-sections of the reaction zone a radiation flux density which is uniform.

6. A process according to claim 5, wherein the reactive medium is flowed longitudinally through the reaction zone at a transversely substantially uniform velocity.

7. A process according to claim 5, said laser radiation being directed into the reaction zone as a convergent hollow conical beam, further including the steps of
(i) optically reversing the beam after a plurality of reflections along said successive paths, and
(ii) directing the beam from the reaction zone as a divergent hollow conical beam coincident with said convergent hollow conical beam.

8. In a process for laser isotope separation by reacting laser radiation with a reactive fluid containing isotopic species selectively excitable by the laser radiation, the steps of:
providing a reaction zone having an axis of symmetry and bounded by opposed first and second ends defining an axially symmetrical flow path through said zone extending therebetween,
providing at said ends a pair of opposed, coaxial reflecting surfaces,
flowing the reactive medium through the reaction zone in a direction from said first to said second end, the medium containing a reactive species having a predetermined distribution profile transverse to the direction of flow,
directing a beam of laser radiation having a predetermined cross-sectional configuration into the reaction zone along an axially symmetrical path intersected by one of said reflecting surfaces, and successively reflecting the beam between said surfaces along successive paths of progressively changing cross-sectional area intersected by respective, contiguous, non-overlapping areas of said surfaces, thereby generating at substantially all transverse cross-sections of the reaction zone a radiation flux density profile which is related in a predetermined manner to the transverse distribution profile of the reactive species said successive paths defining a total path length of between 10 mm and 5 km.

9. Apparatus for reacting laser radiation with a reactive medium, comprising:
a reaction chamber having a pair of spaced, opposed reflecting surfaces defining opposite ends of a reaction zone therein,
respective inlet and outlet means at the opposite ends defining a flow path through said reaction zone,
a radiation-transparent window in said chamber,
means for flowing a reactive medium through the reaction zone from said inlet means to said outlet means, the reactive medium containing a reactive species having a predetermined distribution profile transverse to the direction of flow,
means for directing a beam of laser radiation having a predetermined cross-sectional configuration via said window onto a first area of one of said reflecting surfaces,
said surfaces being respectively contoured to reflect the beam back and forth along successive paths intersected by respective, contiguous, non-overlapping areas thereof whereby to generate at substantially all transverse cross-sections of the reaction zone a radiation flux density profile which is related in a predetermined manner to the transverse distribution profile of the reactive species.

10. Apparatus according to claim 9, said reaction chamber and reflecting surfaces having a longitudinal common axis of symmetry and said radiation-transparent window being an annular window arranged coaxially therewith.

11. Apparatus according to claim 10, at least one of the reflecting surfaces being an aspheric mirror.

12. Apparatus according to claim 11, said means for directing a beam of laser radiation comprising a conical mirror positioned to receive a beam of incident laser radiation, a frusto-conical mirror positioned to receive rays of incident radiation reflected from the conical mirror and reflect them as a convergent conical beam towards said first area of said one reflecting surface.

* * * * *